(12) United States Patent
Wotzak

(10) Patent No.: US 10,072,582 B2
(45) Date of Patent: Sep. 11, 2018

(54) INTEGRAL OFFSET OIL TANK FOR INLINE ACCESSORY GEARBOX

(71) Applicant: General Electric Company, Schenectady, NY (US)

(72) Inventor: Mark Gregory Wotzak, Chestnut Hill, MA (US)

(73) Assignee: General Electric Company, Schenectady, NY (US)

(*) Notice: Subject to any disclaimer, the term of this patent is extended or adjusted under 35 U.S.C. 154(b) by 329 days.

(21) Appl. No.: 15/140,532

(22) Filed: Apr. 28, 2016

(65) Prior Publication Data
US 2017/0314474 A1     Nov. 2, 2017

(51) Int. Cl.
| | |
|---|---|
| F02K 3/02 | (2006.01) |
| F02C 7/32 | (2006.01) |
| F02K 3/06 | (2006.01) |
| F16H 57/04 | (2010.01) |
| F01D 25/18 | (2006.01) |
| F02C 6/20 | (2006.01) |
| F02C 7/06 | (2006.01) |
| B64D 27/00 | (2006.01) |

(52) U.S. Cl.
CPC ............... *F02C 7/32* (2013.01); *F01D 25/18* (2013.01); *F02C 6/206* (2013.01); *F02C 7/06* (2013.01); *F02K 3/06* (2013.01); *F16H 57/04* (2013.01); *B64D 2027/005* (2013.01); *F05D 2260/4031* (2013.01); *F05D 2260/98* (2013.01)

(58) Field of Classification Search
CPC ... B64D 2027/005; F01D 25/18; F02C 6/206; F02C 7/06; F02C 7/32; F02K 3/06; F05D 2260/4031; F05D 2260/98; F16H 57/04
See application file for complete search history.

(56) References Cited

U.S. PATENT DOCUMENTS

| | | | |
|---|---|---|---|
| 4,669,263 A | * | 6/1987 | Sugiyama ............... F01D 25/18 |
| | | | 184/6.11 |
| 5,097,926 A | | 3/1992 | Duello |
| 5,319,920 A | | 6/1994 | Taylor |
| 5,408,821 A | | 4/1995 | Romero et al. |
| 6,231,012 B1 | | 5/2001 | Cacciola et al. |
| 6,264,138 B1 | | 7/2001 | Hawkins |
| 7,007,890 B2 | | 3/2006 | Beutin et al. |
| 7,849,668 B2 | | 12/2010 | Sheridan |
| 7,930,953 B2 | | 4/2011 | Frost |
| 8,083,030 B2 | | 12/2011 | Portlock |
| 8,230,636 B1 | | 7/2012 | Swan |

(Continued)

FOREIGN PATENT DOCUMENTS

WO    2008/113088 A1    9/2008

OTHER PUBLICATIONS

International Search Report and Written Opinion issued in connection with corresponding PCT Application No. PCT/US2017/026815 dated Jul. 10, 2017.

*Primary Examiner* — Jesse Bogue
(74) *Attorney, Agent, or Firm* — General Electric Company; Pamela Kachur

(57) ABSTRACT

An in-line propeller gearbox of a turboprop gas turbine engine includes a lubricant reservoir disposed spaced radially offset from the engine's central axis of rotation and asymmetrically with respect to the central axis of rotation such that the central axis of rotation does not extend through the lubricant reservoir.

20 Claims, 6 Drawing Sheets

(56) References Cited

U.S. PATENT DOCUMENTS

| | | | |
|---|---|---|---|
| 8,886,438 B2 | 11/2014 | Duke et al. | |
| 8,893,856 B2 * | 11/2014 | Frost | F01D 25/18 |
| | | | 184/6.11 |
| 8,905,191 B2 * | 12/2014 | Brandt | F01D 25/18 |
| | | | 184/6.11 |
| 9,016,068 B2 * | 4/2015 | Martin | F02C 7/20 |
| | | | 244/58 |
| 9,062,611 B2 * | 6/2015 | Sheridan | F02C 7/32 |
| 9,194,294 B2 | 11/2015 | Suciu et al. | |
| 2010/0132365 A1 * | 6/2010 | Labala | F01D 25/18 |
| | | | 60/776 |
| 2012/0087780 A1 * | 4/2012 | Suciu | F01D 17/162 |
| | | | 415/159 |
| 2013/0283758 A1 | 10/2013 | Wotzak | |
| 2014/0010639 A1 | 1/2014 | Snape et al. | |
| 2014/0245744 A1 | 9/2014 | Duke et al. | |
| 2015/0176447 A1 * | 6/2015 | Beier | F02C 7/06 |
| | | | 415/110 |
| 2018/0016982 A1 * | 1/2018 | Wotzak | F04D 29/4206 |

* cited by examiner

INTEGRAL OFFSET OIL TANK FOR INLINE ACCESSORY GEARBOX

FIELD OF THE INVENTION

The present subject matter relates generally to an inline turboprop engine for small business aircraft, and/or more particularly to an inline accessory gearbox therefor.

BACKGROUND OF THE INVENTION

The physical arrangement of the components of an in-line turboprop engine for small business aircraft generally includes in succession beginning from the forward end of the engine, a propeller, an engine exhaust, the engine core, the engine's air intake, a tank for storing lubricating oil, an accessory gearbox and auxiliary accessories that are powered via the accessory gearbox. Thus, the engine core is disposed aft of the engine exhaust, and the air intake is disposed aft of the engine core.

The flow of gasses through the gas turbine engine proceeds from the engine's air intake and proceeds generally downstream toward the engine's exhaust. The gas turbine engine generally includes, in serial fluid flow order, the air intake, a compressor section, a combustion section, a high pressure turbine section, a power turbine section and an exhaust section. Air is drawn into the air intake and compressed by the compressor in the compressor section. Fuel is added to the compressed air in the combustion section, and the fuel-air mixture is combusted in the combustion section to produce hot combustion gases that expand successively through the high pressure turbine section and then the power turbine section and produce rotational mechanical energy that can be tapped to drive one or more shafts that are coupled to the high pressure turbine and the power turbine.

A number of auxiliary accessories are mounted to the aft end of the engine and may include such accessories like a starter, a fuel pump, and an electric generator. The power to drive these auxiliary accessories is taken off the rotation of the compressor shaft via an accessory gearbox that receives its lubrication from an accessory oil tank that is disposed between the engine's air intake and the accessory gearbox. The accessory oil tank also typically is sized to house the pump that transfers the oil from the oil tank to the accessory gearbox and to other lubrication sites within the engine. The forward end of a quill shaft is splined into the aft end of the compressor shaft, and the quill shaft extends axially through the accessory oil tank and into the accessory gearbox. The aft end of the quill shaft has a pinion gear that meshes with a power takeoff gear that is rotatably mounted within the accessory gearbox to distribute rotatable power that drives the accessory driveshafts that in turn power the auxiliary accessories that are mounted to the aft end of the accessory gearbox. The quill shaft is rotatably supported by at least two bearings, and there are seals where the quill shaft extends through each of the forward and aft walls of the accessory oil tank, which has an interior that defines an annular space in which the lubricating oil is stored. The propeller, the power turbine shaft, the compressor shaft and the quill shaft all rotate about the same axis of rotation and are arranged successively in line end-to-end with each other.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, the lubrication reservoir for the accessory gearbox of an in-line propeller gearbox of a turboprop gas turbine engine is repositioned to one side of the accessory gearbox rather than the conventional orientation of being disposed in line with the air intake manifold of the engine. The lubricant reservoir disposed spaced radially offset from the engine's central axis of rotation and asymmetrically with respect to the central axis of rotation such that the central axis of rotation does not extend through the lubricant reservoir. In an exemplary embodiment, the lubrication reservoir is rendered as a unitary structure together with the air intake manifold and/or the accessory gearbox. In an exemplary embodiment, the lubrication reservoir has a shape that extends aft of the auxiliary gearbox but does not extend beyond the projection of the longest accessory that is mounted to the accessory gearbox. In an exemplary embodiment, the volume of the interior of the intermediate portion of the lubricant reservoir is greater than the volume of the interior of the lower portion of the lubricant reservoir.

Each of the exemplary embodiments of the present disclosure permits the turboprop engine to reduce the axial length of the engine. Each of the exemplary embodiments of the present disclosure permits the turboprop engine to reduce the volume of oil needed for lubrication of the accessory gearbox. Each of the exemplary embodiments of the present disclosure permits modern oil level sensors to be incorporated into the turboprop engine to allow more accurate monitoring of the engine's performance. Each of the exemplary embodiments of the present disclosure permits the turboprop engine to reduce the number of bearings required to transmit the rotation of the compressor shaft to power the auxiliary accessories, thereby reducing the heat generated during engine operation. Each of the exemplary embodiments of the present disclosure permits the turboprop engine to reduce the number of seals required to isolate oil wetted areas, thereby reducing the cost of manufacturing the engine and maintaining the engine once in service. In so doing, the cost, weight and space requirements of the engine are significantly less than those same requirements for an engine with a conventional lubrication assembly for the accessory gearbox.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF ILLUSTRATIVE EMBODIMENTS

Figure 1:
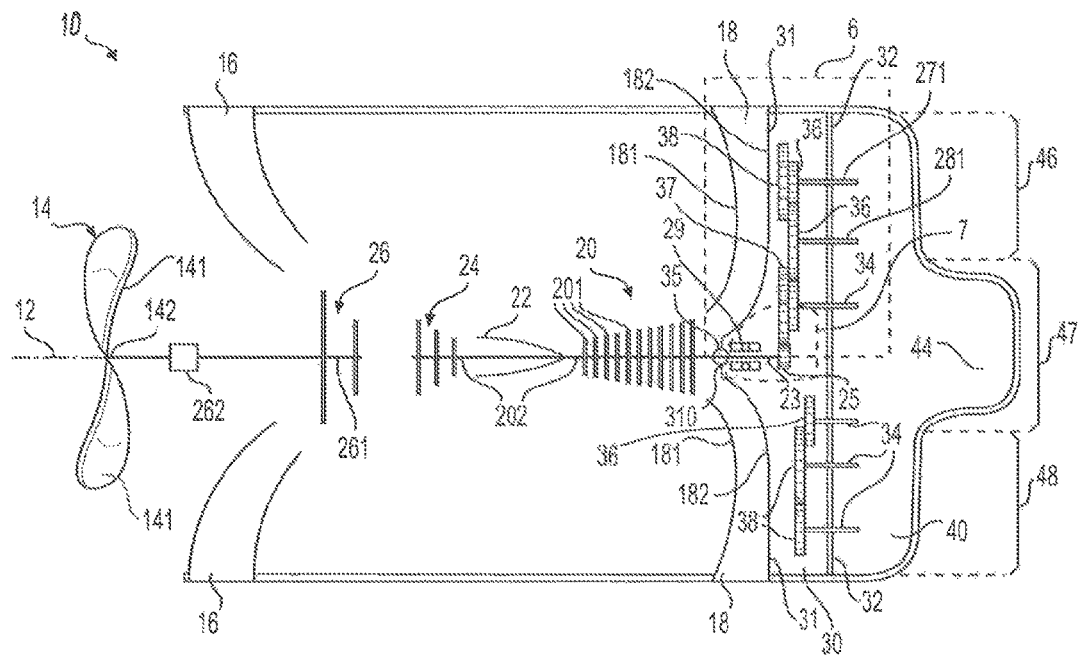
FIG. 1 is a schematic of an axial cross-sectional view of an exemplary in-line turboprop gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid can be a gas such as air or a liquid such as a lubricant.

Referring now to the drawings, wherein identical numerals indicate the same elements throughout the drawings, FIG. 1 is a schematic view of an inline turboprop gas turbine engine in accordance with an exemplary embodiment of the present disclosure and generally designated by the numeral 10. The configuration and operation of a conventional inline turboprop gas turbine engine is well known and thus need not be repeated herein in any detail. Nonetheless, there will be references to certain of its conventional components to the extent necessary to explain the environmental context of the present invention.

The schematic view of FIG. 1 represents a longitudinal cross-section taken through the central plane of the engine 10 slicing from the top of the engine 10 to the bottom of the engine 10 and with the top located in the portion of the drawing where the 6 is positioned. As schematically depicted in FIG. 1, the engine 10 generally exhibits a cylindrical shape that is symmetrical about a virtual central axis that is provided for reference, and the axial direction extends parallel to the virtual central axis, while a radial direction is normal (i.e., transverse) to the axial direction.

Figure 2:
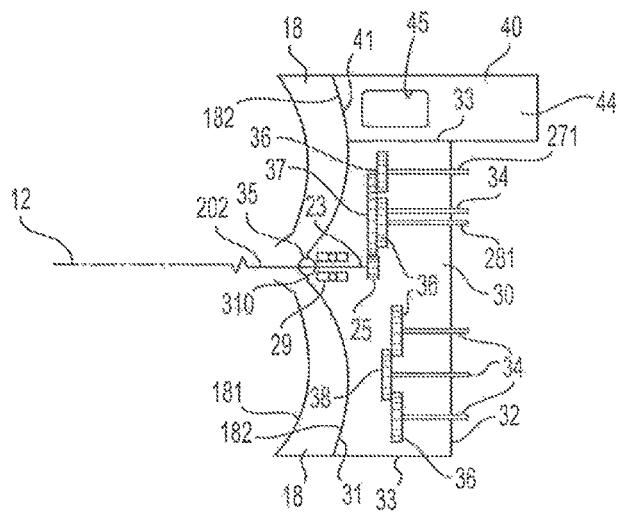
FIG. 2 is a schematic of a transverse cross-sectional view of the air intake and accessory gearbox of an exemplary in-line turboprop gas turbine engine according to various embodiments of the present disclosure.

The schematic view of FIG. 2 represents a longitudinal cross-section in a plane that slices through the view of FIG. 1 with a central plane that is oriented normal to the plane of the view depicted in FIG. 1 and thus yields a view looking down from above the engine 10. However, FIG. 2 only includes that portion of the engine 10 that is disposed aft of the engine's compressor 20.

As schematically depicted in FIG. 1, the engine 10 has a propeller 14 at the forward end of the engine 10, and the propeller 14 includes a plurality of blades 141 that extend radially from a hub 142. The propeller 14 is rotatable about an axis of rotation that is defined centrally through the hub and co-extensive with the virtual central axis 12.

As is conventional, an exhaust manifold 16 is disposed at the forward end of the engine 10, and an air intake manifold 18 of the engine 10 disposed near the aft end of the engine 10. Referring to FIG. 1, after entering the engine's air intake manifold 18, the air moves downstream and enters the engine's compressor 20 where the compressor blades 201 attached to a compressor shaft 202 are rotating to compress the air and force the compressed air downstream into the combustor 22 where the compressed air is mixed with fuel supplied conventionally from a fuel supply (not shown) and ignited. The burning of the air-fuel mixture generates hot gases that rapidly expand and move downstream into a high pressure turbine 24 that is coupled to the forward end of the compressor shaft 202 and thus drives the compressor 20. Upon leaving the high pressure turbine 24, the gases continue moving downstream to expand through a power turbine 26 that is coupled to the aft end of a power turbine shaft 261, which is rotatably driven by the power turbine 26. After having moved downstream completely through the power turbine 26, the combustion gases that exit the power turbine 26 move downstream into the exhaust manifold 16 that carries the engine exhaust out of the engine 10 and into the ambient atmosphere surrounding the engine 10. As is conventional, the forward end of the power turbine shaft 261 is coupled to the propeller 14 that accordingly is driven by the power turbine 26, typically through a power gearbox 262, which is schematically represented in FIG. 1. Thus, each of the foregoing components is successively disposed in line one after the other and symmetrically rotatable about the same virtual axis of rotation 12.

Figure 3:
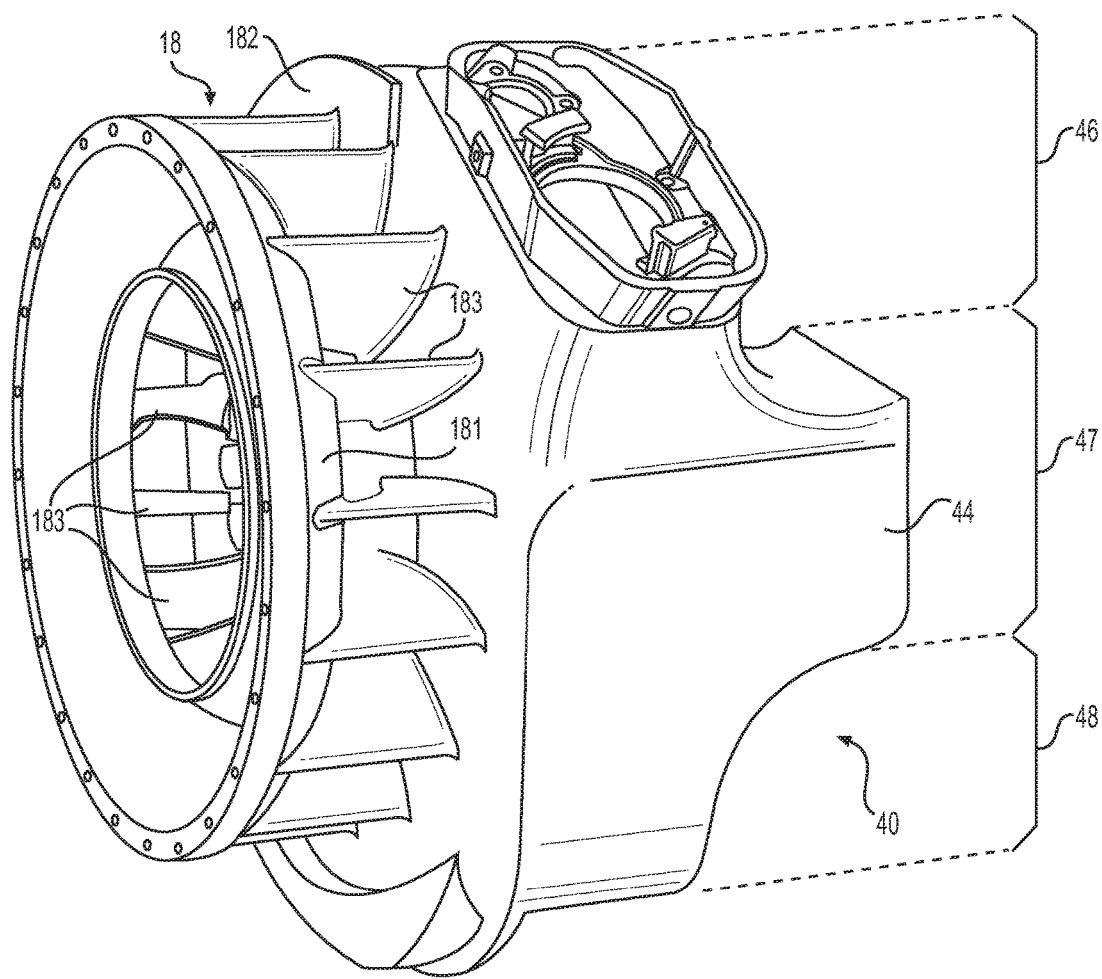
FIG. 3 is a perspective view of the integrated air intake, accessory gearbox and side-mounted oil tank of an exemplary in-line turboprop gas turbine engine according to various embodiments of the present disclosure.
Figure 4:
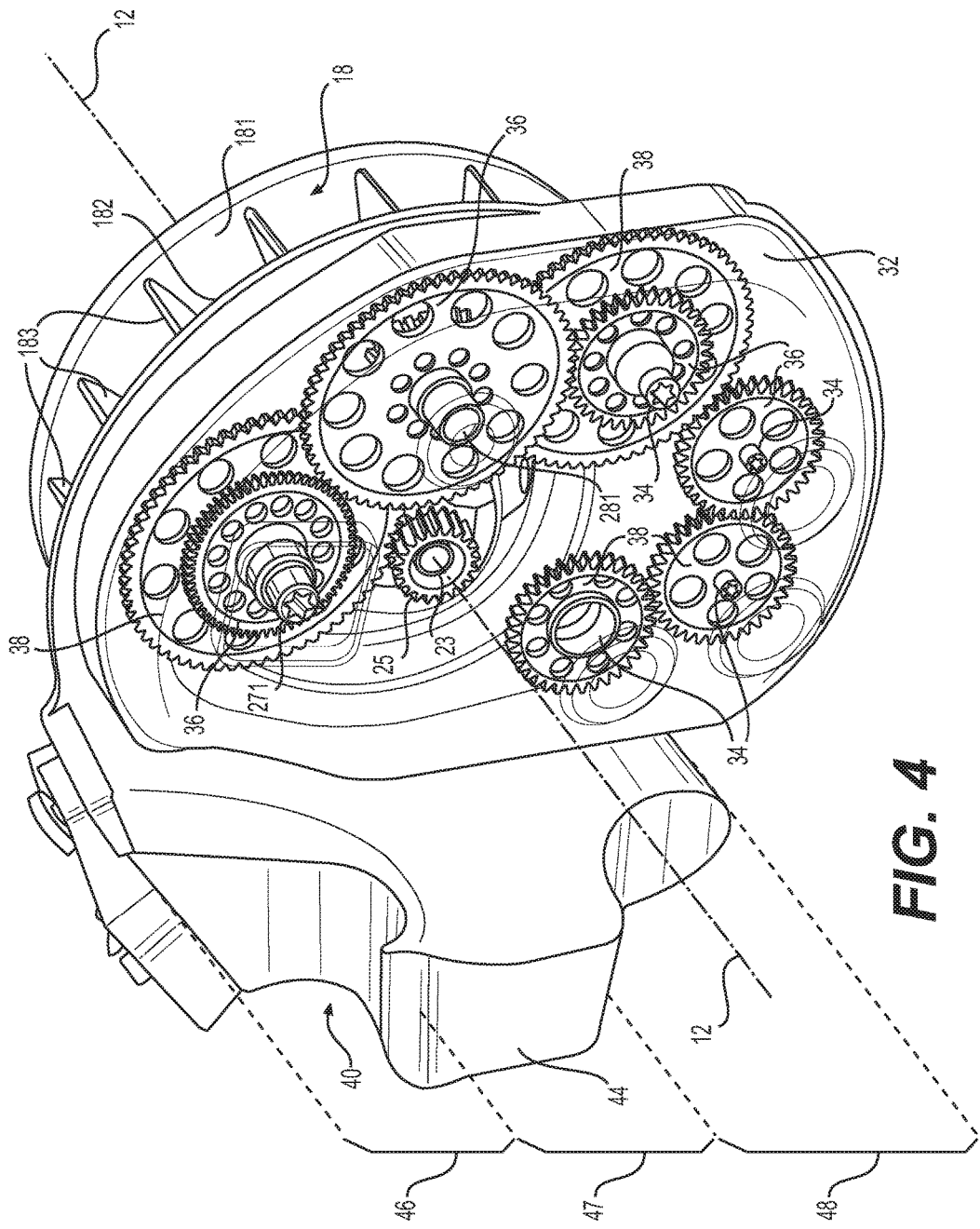
FIG. 4 is a perspective view of the integrated air intake, accessory gearbox and side-mounted oil tank of an exemplary in-line turboprop gas turbine engine according to various embodiments of the present disclosure, taken from the opposite end of the perspective view of FIG. 3 and with the cover rendered as if transparent so as to enable the viewer to see inside the gearbox.
Figure 6:
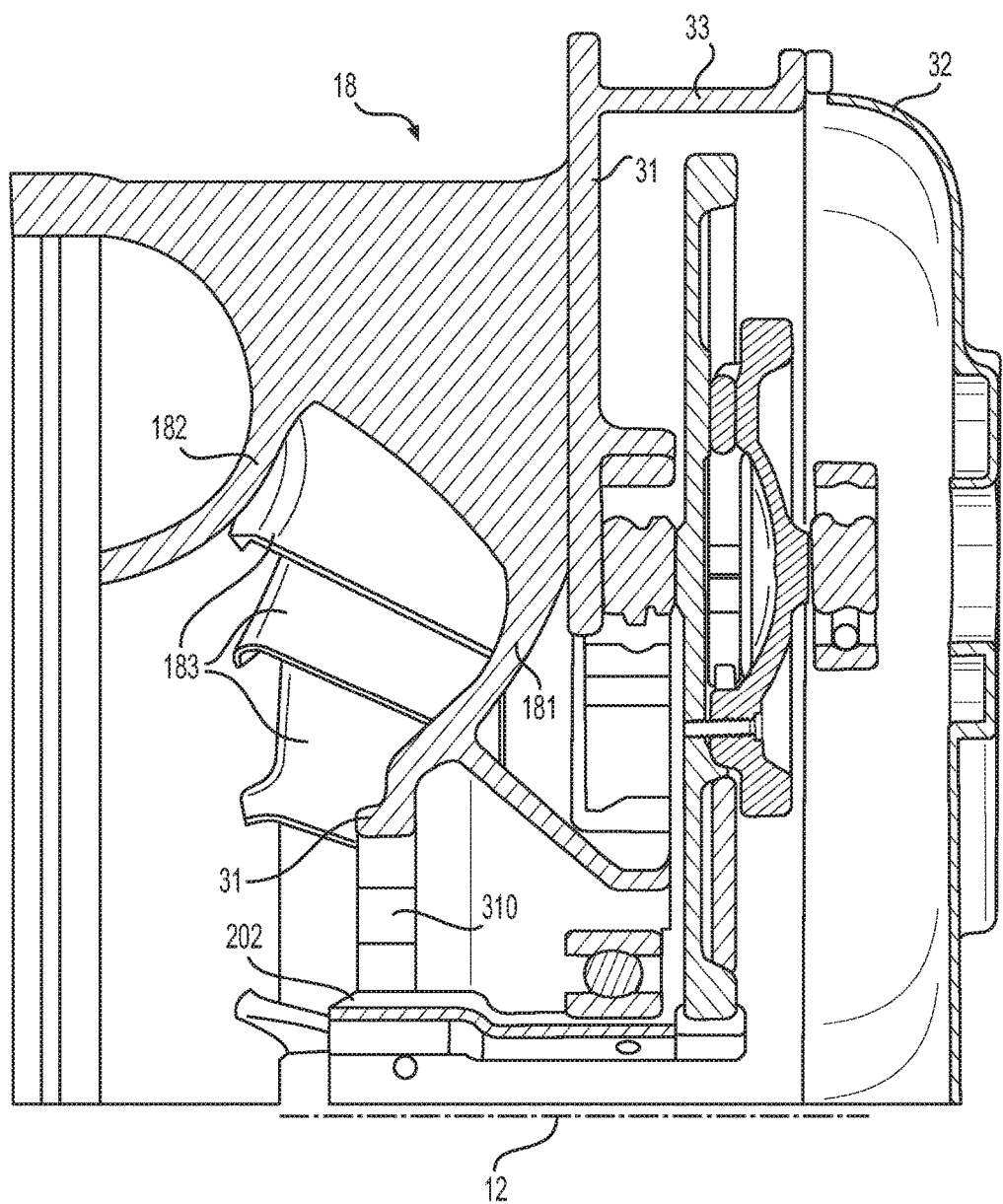
FIG. 6 is a cross-sectional view of an embodiment of the aft end of the compressor shaft disposed within the accessory gearbox along with the pinion engaging the take-off gear.

As schematically shown in FIG. 1, the air inlet for the engine 10 is provided in the form of an air intake manifold 18 that is disposed aft of the compressor 20 and defines a front wall 181 and a rear wall 182 that is disposed aft of the front wall 181. As shown in FIGS. 3, 4 and 6, the air intake manifold 18 defines a plurality of guide vanes 183, and each guide vane 183 extends between the front wall 181 and the rear wall 182. The individual guide vanes 183 are spaced apart from one another circumferentially around the air intake manifold 18.

At the engine's extreme end that is axially opposite the end where the propeller 14 is disposed and aft of the air intake manifold 18 is the engine's aft end, where conventionally one finds disposed a plurality of auxiliary accessories for the engine 10. The number and type of these auxiliary accessories can vary in any conventional manner. To provide context to the present invention, a couple of examples of these auxiliary accessories like a starter 27 and a fuel metering unit 28 are depicted schematically in FIG. 5. However, since the details of these auxiliary accessories are not necessary to an understanding of the present invention, these auxiliary accessories will not be discussed in any detail here. Suffice it to say that each of these auxiliary accessories 27, 28 could be coupled to a respective accessory driveshaft 271, 281 that is rotatable to provide power to operate the respective auxiliary accessory 27, 28.

As schematically shown in FIGS. 1 and 2 and explained more fully below in accordance with aspects of the present invention, each of these respective accessory driveshafts 271, 281 in turn can be supplied with rotational power via an accessory gearbox 30, which is itself provided with an input torque that is taken from the engine's compressor shaft 202. A lubricant reservoir 40 is provided to maintain a reliable supply of lubricating fluid for the gearing that is disposed within the accessory gearbox 30 and connected to the accessory driveshafts 271, 281 as well as for other lubrication sites within the engine. Another aspect of the present invention described more fully hereafter pertains to the configuration of the lubricant reservoir 40 and the disposition of the lubricant reservoir 40 with respect to the engine's accessory gearbox 30 and with respect to the air intake manifold 18 of the engine 10. As is conventional, the engine 10 carries a lubricant supply that provides the lubricating fluid to the lubricant reservoir 40, however the details of the lubricant supply need not be of concern in order to understand the present invention.

In accordance with the present invention, a lubrication assembly is provided for storing lubricating fluid and pumping same to the accessory gearbox connected to the auxiliary accessories. Briefly, the lubrication assembly desirably includes an accessory gearbox 30, a plurality of rotatable driveshafts (e.g., 271, 281) disposed at least partially within the accessory gearbox 30, gearing (e.g., 36, 38) disposed within the accessory gearbox 30 and connected to the driveshafts (e.g., 271, 281), and a lubricant reservoir 40 that is configured to be connected to be supplied with lubrication fluid from the lubricant supply of the engine 10.

As schematically shown in FIGS. 1 and 2 for example, the accessory gearbox 30 desirably includes a forward wall 31 extending transversely with respect to the axial direction. The forward wall 31 of the accessory gearbox at least partially defines the rear wall 182 of the air intake manifold 18 of the engine 10. As schematically shown in FIGS. 1 and 2 for example, an aft wall 32 of the accessory gearbox is spaced apart from the forward wall 31 in the axial direction and disposed aft of the forward wall 31. As schematically shown in FIGS. 1, 2, 4 and 5 for example, the accessory gearbox 30 includes at least a first sidewall 33 extending in the axial direction to connect the forward wall 31 to the aft wall 32. Desirably, the first sidewall 33 and the aft wall 32 of the accessory gearbox 30 are formed as a unitary structure to form a cover for the accessory gearbox 30 that can be selectively removable for purposes of performing maintenance on the contents of the accessory gearbox 30. The removable cover formed by the aft wall 32 and the first sidewall 33 of the accessory gearbox 30 is selectively attachable and detachable in any conventional manner (as by mechanical fasteners for example) to the forward wall 31 in order to provide selective access to the interior space that is confined within the accessory gearbox 30.

Figure 5:
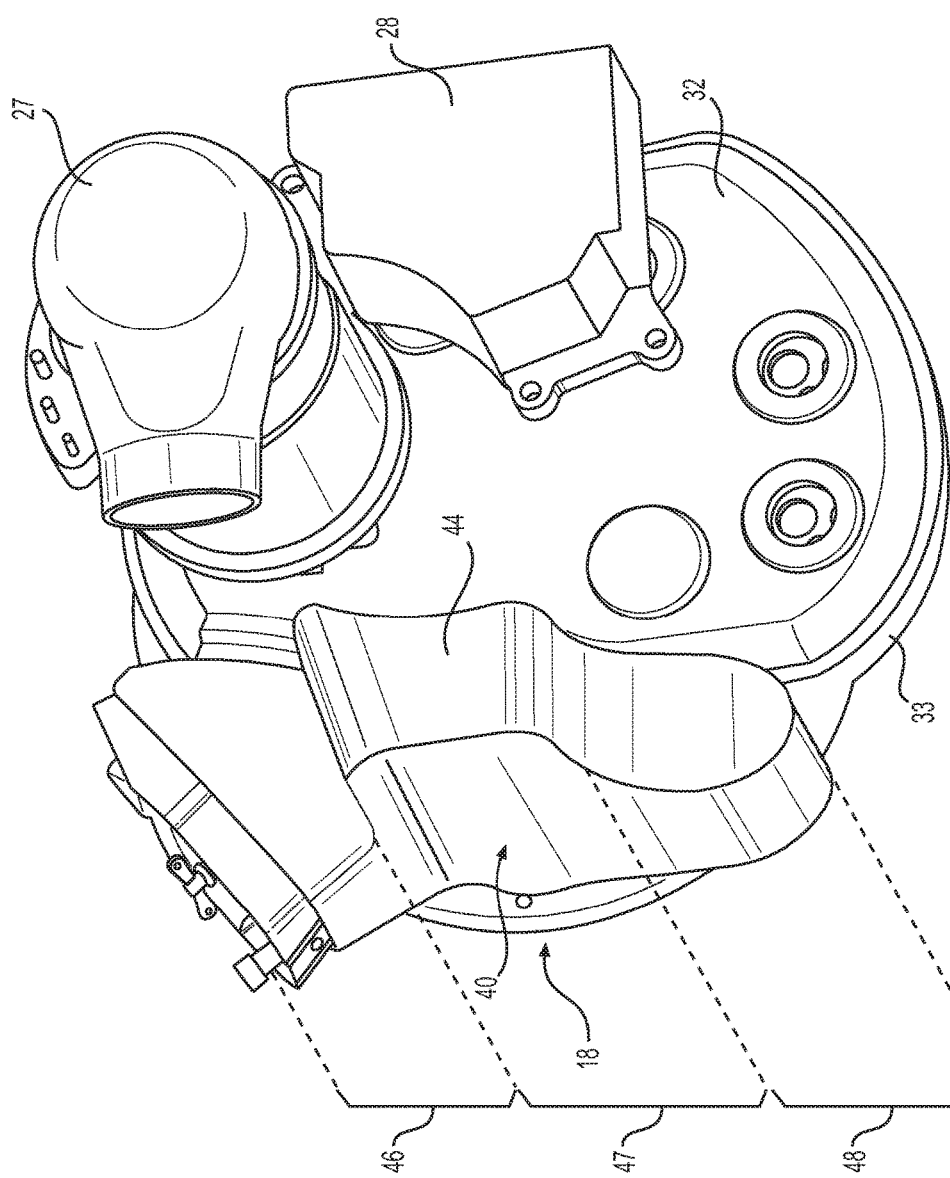
FIG. 5 is a perspective view of the integrated air intake, accessory gearbox and side-mounted oil tank of an exemplary in-line turboprop gas turbine engine according to various embodiments of the present disclosure, taken from the opposite end of the perspective of FIG. 3 and with the cover attached to the unitary section of the housing of the accessory gearbox and two of the auxiliary accessories mounted onto the cover.

As schematically shown in FIGS. 1 and 2 for example, a plurality of accessory driveshafts 271, 281, 34 is provided. Each of these accessory driveshafts 271, 281, 34 is rotatably supported within the accessory gearbox 30 and extends along the axial direction through the aft wall 32 of the accessory gearbox 30. Each respective rotatable driveshaft 271, 281, 34 is disposed to be connected to drive a respective one of the engine's auxiliary accessories (e.g., 27, 28) that are mounted to the exterior of the aft wall 32 of the accessory gearbox 30 as shown in FIG. 5 for example. As shown in FIGS. 1, 2 and 4 for example, gearing 36, 38 is disposed within the accessory gearbox 30, and one or more gear(s) 36, 38 is (are) connected to respective ones of the accessory driveshafts 271, 281, 34 so that they are drivingly interconnected to be driven off of a single rotatable input that is supplied by the rotation of the compressor shaft 202.

Figure 7:
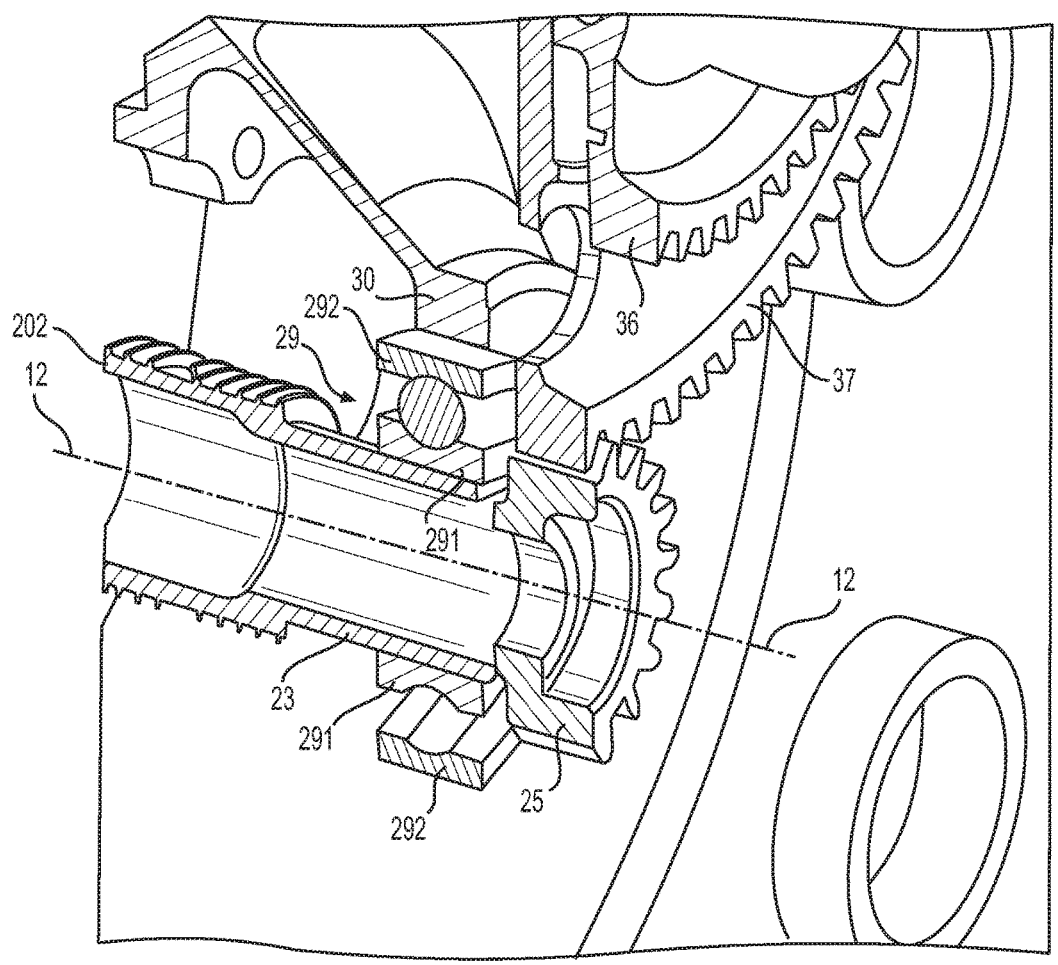
FIG. 7 is a view shown partially in perspective and partially in cross-section of an embodiment of the aft end of the compressor shaft disposed within the accessory gearbox along with the pinion engaging the take-off gear.

As shown in FIGS. 1, 2 and 6 for example, the forward wall 31 of the accessory gearbox 30 defines an opening 310 configured for receiving the compressor shaft 202 therethrough. As shown in FIGS. 6 and 7 for example, the aft end of the compressor shaft 202 is disposed within the accessory gearbox 30. As schematically shown in FIGS. 1 and 2 for example, a lubricant seal 35 is disposed within the opening defined 310 through forward wall 31 of the accessory gearbox 30. The lubricant seal 35 prevents leakage of lubricating fluid between the compressor shaft 202 and the opening 310 in the forward wall 31 of the accessory gearbox 30.

As shown in FIG. 7 for example, a journal 23 has a first end configured for being non-rotatably coupled to the aft end of the compressor shaft 202. The journal 23 has a second end disposed axially spaced apart from the first end, and a pinion 25 is non-rotatably coupled to the second end of the journal 23. As schematically shown in FIGS. 1 and 2 for example, a bearing 29 is disposed within the accessory gearbox 30. As shown in FIG. 7 for example, the bearing 29 has an inner race non-rotatably coupled to the journal 23 and an outer race 292 non-rotatably coupled to the accessory gearbox 30. Desirably only a single bearing 29 is required to rotatably support the journal 23, and the bearing 29 desirably is a ball bearing having its inner race 291 rotatable with respect to its outer race 292. A take-off gear 37 is rotatably supported within the accessory gearbox 30 and drivingly engaged by the pinion 25 for transmitting driving torque from the compressor shaft 202 to the take-off gear 37 for driving the accessory driveshafts 271, 281, 34 that power the auxiliary accessories. Though not depicted in the drawings, an alternative arrangement can include a separate quill shaft that transmits the rotation of the compressor 20 to drive the pinion 25.

The lubrication assembly of the present invention includes a lubricant reservoir 40 for storing lubricant for the accessory gearbox 30, and the lubricant reservoir 40 is configured to be connected to be supplied with lubricant from the lubricant supply of the engine 10. As schematically shown in FIG. 2 for example, a lubricant reservoir 40 for containing lubricant for the accessory gearbox 10 is defined, at least in part, by the first sidewall 33 of the accessory gearbox 30, and the first sidewall 33 is disposed to separate the lubricant reservoir 40 from the accessory gearbox 30.

As schematically shown in FIG. 2 for example, in one of the exemplary embodiments of the present disclosure the lubricant reservoir 40 includes a forward wall 41 that forms part of the aft wall 182 of the air intake manifold 18 and renders the lubricant reservoir 40 and the air intake manifold 18 a unitary structure. Indeed, because in one of the exemplary embodiments of the present disclosure the aft wall 182 of the air intake manifold 18 and the forward wall 41 of the lubricant reservoir 40 form a unitary structure, the lubricant reservoir 40, the air intake manifold 18 and the forward wall 31 and first sidewall 33 of the accessory gearbox 30 can be molded as a unitary structure.

As schematically shown in FIGS. 2 and 4 for example, the lubricant reservoir 40 is disposed spaced radially offset from the central axis of rotation 12 and asymmetrically with respect to the central axis of rotation 12 such that the central axis of rotation 12 does not extend through the lubricant reservoir 40. Thus, the lubrication assembly of the present invention permits a reduction in the axial length of the engine 10, possibly affording an axial length reduction of more than 3 inches for example, and accordingly a reduction in the length of the rotating shafts that provide the power to the engine accessories via the accessory gearbox 30. Along with this reduction in shaft length comes the ability to eliminate one or more bearings and journals that otherwise would be required to support the length of the rotating shaft, thereby eliminating manufacturing and maintenance costs as well as increasing the operating reliability of the engine 10. Additionally, unlike the conventional in-line oil tank that requires seals at each end of the driveshaft extending through the oil tank and into the accessory gearbox, the lubrication assembly of the present invention eliminates such seals and thereby provides cost reductions for manufacturing the engine 10 and for maintaining the engine 10 when in operation as well as rendering operation of the engine 10 more reliable when in service on the aircraft.

As schematically shown in FIGS. 1, 2, 3, 4 and 5 for example, the lubricant reservoir 40 defines an aft chamber 44. As schematically shown in FIGS. 1 and 2 for example, the aft chamber 44 of the lubricant reservoir 40 is the portion of the lubricant reservoir 40 that projects axially in the aft direction beyond the aft wall 32 of the accessory gearbox 30. Thus, the lubricant reservoir 40 is configured with a shape that encloses less internal volume at the aft end than the internal volume enclosed at the forward end that is disposed opposite to the aft end of the lubricant reservoir 40.

As schematically shown in FIGS. 1, 3, 4 and 5 for example, the lubricant reservoir 40 defines an upper portion 46 and a lower portion 48 disposed spaced apart from the upper portion 46. Moreover, the lubricant reservoir 40 defines an intermediate portion 47 disposed intermediate the upper portion 46 and the lower portion 48. As schematically shown in FIGS. 1, 3, 4 and 5 for example, the intermediate portion 47 of the lubricant reservoir 40 includes the aft chamber 44 of the lubricant reservoir 40.

FIGS. 1, 2, 3, 4 and 5 are displayed to the viewer with the lubricant reservoir 40 oriented as would be the case with the engine 10 mounted on the aircraft in a normal operational orientation of the aircraft and the engine 10. That is with the oil fill fixture 45 at the top of the upper portion 46 of the lubricant reservoir 40, and the lubricating fluid, which is some grade of lubricating oil, would be introduced into the lubricant reservoir 40 via the oil fill fixture 45. Moreover, the pump that transfers the lubricating fluid from the lubricant reservoir 40 to the accessory gearbox 30 and to other lubrication sites within the engine 10 can be housed within the upper portion 46 of the lubricant reservoir 40 or disposed elsewhere that space permits for a more efficient use of the space occupied by the engine 10.

As shown from the opposite perspective views of FIGS. 3 and 5 for example, the volume of the interior of the intermediate portion 47 of the lubricant reservoir 40 is greater than the volume of the interior of the lower portion 48 of the lubricant reservoir 40. Because of the concentration of the volume encompassed by the lubricant reservoir 40 in the intermediate portion 47 relative to the volume encompassed by the lower portion 48, the effects of pitch, roll and yaw on the level of lubricating fluid in the engine 10 during operation of the aircraft are diminished relative to a conventional engine with a conventional in-line oil tank for the accessory gearbox. Accordingly, the unique shape of the lubricant reservoir 40 of the present invention lends itself more readily to installation of electronic level sensors than the conventional in-line oil tanks. Additionally, the unique shape of the lubricant reservoir 40 of the present invention means that the volume of oil surrounding the oil pickup at any attitude of the lubricant reservoir 40 is less than the volume of oil surrounding the oil pickup of conventional in-line oil tanks. Thus, the unique shape of the lubricant reservoir 40 of the present invention more readily is able to maintain a reliable supply of lubricating fluid during pitch, roll and yaw of the engine 10 during operation of the aircraft than the conventional in-line oil tanks.

In accordance with the present invention, the lubrication assembly can be integrated with the air intake manifold 18 and affords a more efficient allocation of the volume occupied by the engine 10 such that the cost, weight and space requirements of the engine 10 are significantly reduced compared to those same requirements for an engine with a conventional lubrication assembly for the accessory gearbox 30. Each of the above exemplary embodiments of the present disclosure permits the turboprop engine 10 to reduce the amount of lubricating fluid that needs to be carried in order to furnish the accessory gearbox 30 with appropriate lubrication. This reduction translates into a weight reduction for operation of the engine, and this weight reduction enhances the operating capability of the aircraft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims. For instance, features illustrated or described as part of one embodiment may be used on another embodiment to yield a still further embodiment. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A lubrication assembly for auxiliary accessories disposed at the aft end of an in-line turboprop engine having a central axis of rotation defining an axial direction and including a compressor coupled to a compressor shaft that is rotatable about the central axis of rotation, a lubricant supply, an exhaust manifold and an air intake manifold disposed axially aft of the exhaust manifold, the lubrication assembly comprising:

an accessory gearbox including a forward wall extending transversely with respect to the axial direction, an aft wall spaced apart from the forward wall in the axial direction and disposed aft of the forward wall, and at least a first sidewall extending in the axial direction and connecting the forward wall to the aft wall, the forward wall of the accessory gearbox at least partially defining the air intake manifold of the engine;

a plurality of rotatable shafts that are extending along the axial direction through the aft wall of the accessory gearbox, each respective rotatable shaft being disposed to be connected to drive a respective one of the auxiliary accessories of the engine;

gearing disposed within the accessory gearbox and connected to the shafts; and a lubricant reservoir for containing lubricant for the accessory gearbox, the lubricant reservoir being configured to be connected to be supplied with lubricant from the lubricant supply of the engine, the lubricant reservoir being defined in part by the first sidewall of the accessory gearbox, the first sidewall being disposed to separate the lubricant reservoir from the accessory gearbox, and wherein the lubricant reservoir defines an aft chamber projecting axially aft beyond the aft wall of the accessory gearbox.

2. The lubrication assembly of claim 1, wherein the lubricant reservoir is disposed spaced radially offset from the central axis of rotation and asymmetrically with respect to the central axis of rotation such that the central axis of rotation does not extend through the lubricant reservoir.

3. The lubrication assembly of claim 1, wherein the lubricant reservoir includes a forward wall that forms part of the air intake manifold and renders the lubricant reservoir and the air intake manifold a unitary structure.

4. The lubrication assembly of claim 1, wherein the lubricant reservoir being of a shape that encloses less internal volume at the aft end than the internal volume enclosed at the forward end that is disposed opposite to the aft end of the lubricant reservoir.

5. The lubrication assembly of claim 1, wherein the lubricant reservoir defines an upper portion and a lower portion disposed spaced apart from the upper portion, wherein the lubricant reservoir defines an intermediate portion disposed intermediate the upper portion and the lower portion and wherein the volume of the interior of the intermediate portion of the lubricant reservoir is greater than the volume of the interior of the lower portion of the lubricant reservoir.

6. The lubrication assembly of claim 5, wherein the intermediate portion of the lubricant reservoir includes the aft chamber of the lubricant reservoir.

7. The lubrication assembly of claim 1, wherein the forward wall of the accessory gearbox defines an opening configured for receiving the compressor shaft therethrough and disposing an aft end of the compressor shaft within the accessory gearbox.

8. The lubrication assembly of claim 7, further comprising:
a journal having a first end configured for being non-rotatably coupled to the aft end of the compressor shaft and having a second end disposed axially spaced apart from the first end, and
a pinion non-rotatably coupled to the second end of the journal.

9. The lubrication assembly of claim 8, further comprising:
a take-off gear rotatably supported within the accessory gearbox and drivingly engaged by the pinion for transmitting driving torque from the compressor shaft to the take-off gear for powering the auxiliary accessories.

10. The lubrication assembly of claim 8, further comprising a bearing disposed within the accessory gearbox and having an outer race non-rotatably coupled to the accessory gearbox and an inner race rotatable with respect to the outer race and non-rotatably coupled to the journal.

11. The lubrication assembly of claim 7, further comprising a lubricant seal disposed within the opening defined through forward wall of the accessory gearbox.

12. An in-line turboprop engine comprising:
a propeller disposed at the forward end of the engine and including a plurality of blades extending radially from a hub and rotatable about a first axis of rotation defined centrally through the hub;
a plurality of auxiliary accessories disposed at the aft end of the engine, each of the auxiliary accessories being coupled to a respective accessory driveshaft that is rotatable for providing power to operate the respective auxiliary accessory;
an engine exhaust manifold disposed aft of the propeller;
a power turbine disposed aft of the engine exhaust manifold and coupled to drive rotation of the propeller;
a high pressure turbine disposed aft of the power turbine;
a combustor disposed aft of the high pressure turbine;
a compressor disposed aft of the combustor;
an air intake manifold disposed aft of the compressor and defining a front wall and a rear wall disposed aft of the front wall, the air intake manifold further defining a plurality of guide vanes, each guide vane extending between the front wall and the rear wall, each guide vane being spaced circumferentially apart from each adjacent guide vane;
a lubricant supply carried by the engine;
a lubrication assembly for connection to the auxiliary accessories, the lubrication assembly including:
an accessory gearbox including a forward wall extending transversely with respect to the axial direction, an aft wall spaced apart from the forward wall in the axial direction and disposed aft of the forward wall, and at least a first sidewall extending in the axial direction and connecting the forward wall to the aft wall, the forward wall of the accessory gearbox at least partially defining the rear wall of the air intake manifold of the engine, and
a plurality of rotatable shafts that are extending along the axial direction through the aft wall of the accessory gearbox, each respective rotatable shaft being disposed to be connected to drive a respective one of the auxiliary accessories of the engine,
gearing disposed within the accessory gearbox and connected to the shafts,
a lubricant reservoir for containing lubricant for the accessory gearbox, the lubricant reservoir being configured to be connected to be supplied with lubricant from the lubricant supply of the engine, the lubricant reservoir being defined in part by the first sidewall of the accessory gearbox, the first sidewall being disposed to separate the lubricant reservoir from the accessory gearbox, and
wherein the lubricant reservoir defines an aft chamber projecting axially aft beyond the aft wall of the accessory gearbox.

13. The turboprop engine of claim 12, wherein the lubricant reservoir is disposed spaced radially offset from the central axis of rotation and asymmetrically with respect to the central axis of rotation such that the central axis of rotation does not extend through the lubricant reservoir.

14. The turboprop engine of claim 12, wherein the lubricant reservoir defines an upper portion and a lower portion disposed spaced apart from the upper portion, wherein the lubricant reservoir defines an intermediate portion disposed intermediate the upper portion and the lower portion and wherein the volume of the interior of the intermediate portion of the lubricant reservoir is greater than the volume of the interior of the lower portion of the lubricant reservoir.

15. The turboprop engine of claim 14, wherein the intermediate portion of the lubricant reservoir includes the aft chamber of the lubricant reservoir.

16. The turboprop engine of claim 12, wherein the lubricant reservoir being of a shape that encloses less internal volume at the aft end than the internal volume enclosed at the forward end that is disposed opposite to the first end.

17. The turboprop engine of claim 12, wherein the lubricant reservoir includes a forward wall that forms part of the air intake manifold and renders the lubricant reservoir and the air intake manifold a unitary structure.

18. The turboprop engine of claim 12, wherein the forward wall of the accessory gearbox defines an opening configured for receiving the compressor shaft therethrough and disposing an aft end of the compressor shaft within the accessory gearbox.

19. The turboprop engine of claim 18, further comprising:
   a journal having a first end configured for being non-rotatably coupled to the aft end of the compressor shaft and having a second end disposed axially spaced apart from the first end,
   a bearing disposed within the accessory gearbox and having an outer race non-rotatably coupled to the accessory gearbox and an inner race rotatable with respect to the outer race and non-rotatably coupled to the journal, and
   a pinion non-rotatably coupled to the second end of the journal.

20. The turboprop engine of claim 18 further comprising:
   a lubricant seal disposed within the opening defined through forward wall of the accessory gearbox.

\* \* \* \* \*